(12) United States Patent
Hargrove et al.

(10) Patent No.: US 11,537,684 B2
(45) Date of Patent: Dec. 27, 2022

(54) SYSTEM AND METHOD FOR CREATING AND RENDERING COMPLEX, HIGHLY PERFORMANT WEB INTERVIEWS USING A LOW-CODE EDITOR, SUPPORTING INTEROPERABILITY WITH EXISTING THIRD PARTY DOCUMENT ASSEMBLY SYSTEMS

(71) Applicant: Net Law Group, Inc., Louisville, KY (US)

(72) Inventors: Alex J. Hargrove, Louisville, KY (US); Zlatko Selimanovic Pažanin, Louisville, KY (US)

(73) Assignee: Net Law Group, Inc., Louisville, KY (US)

( * ) Notice: Subject to any disclaimer, the term of this patent is extended or adjusted under 35 U.S.C. 154(b) by 0 days.

(21) Appl. No.: 17/146,131

(22) Filed: Jan. 11, 2021

(65) Prior Publication Data

US 2021/0216600 A1 Jul. 15, 2021

Related U.S. Application Data

(60) Provisional application No. 62/959,507, filed on Jan. 10, 2020.

(51) Int. Cl.
*G06F 16/958* (2019.01)
*G06F 9/54* (2006.01)

(52) U.S. Cl.
CPC ............ *G06F 16/958* (2019.01); *G06F 9/547* (2013.01)

(58) Field of Classification Search
CPC ....... G06F 3/0481; G06F 9/547; G06F 16/958
See application file for complete search history.

(56) References Cited

U.S. PATENT DOCUMENTS

| | | | | |
|---|---|---|---|---|
| 7,734,995 B1* | 6/2010 | Saikaly | ................ | G06F 40/186 715/200 |
| 2006/0129905 A1* | 6/2006 | Spork | ................... | G06F 40/174 715/221 |
| 2006/0245555 A1* | 11/2006 | Makela | ................ | G06F 40/174 379/88.12 |
| 2010/0332973 A1* | 12/2010 | Kloiber | ................ | G06F 40/103 715/255 |

(Continued)

*Primary Examiner* — Eric J. Bycer
(74) *Attorney, Agent, or Firm* — Patrick M. Torre; Stites & Harbison PLLC

(57) ABSTRACT

In a computing system environment, a method for automated document creation by a dynamic content management system is described. A dynamic application programming interface (API) retrieves stored existing and/or persisting user data from a server and constructs a dynamic interview form template. The dynamic API pushes the dynamic template including the retrieved existing and/or persisting document data to a document form engine residing on a user computing device. The document form engine constructs one or more interview form pages from the pushed dynamic template and retrieved existing and/or persisting user data. Each element used to construct the one or more interview form pages is customized to each component of the document being constructed. The selected elements may be one or more of HyperText Markup Language (HTML), Cascading Style Sheets (CSS), JavaScript™, or others.

20 Claims, 15 Drawing Sheets

(56) References Cited

U.S. PATENT DOCUMENTS

| | | | |
|---|---|---|---|
| 2012/0233532 A1* | 9/2012 | Rickabaugh | G06F 40/143 |
| | | | 715/209 |
| 2014/0067866 A1* | 3/2014 | Chen | H04L 69/328 |
| | | | 707/791 |
| 2014/0095968 A1* | 4/2014 | Harrop | G06F 40/174 |
| | | | 715/222 |
| 2014/0122996 A1* | 5/2014 | Gupta | G06F 9/451 |
| | | | 715/234 |
| 2015/0046791 A1* | 2/2015 | Isaacson | G06F 40/103 |
| | | | 715/234 |
| 2016/0077902 A1* | 3/2016 | Feng | G06F 9/54 |
| | | | 719/328 |
| 2017/0270083 A1* | 9/2017 | Pruitt | G06F 16/93 |
| 2018/0173477 A1* | 6/2018 | Porwal | H04N 1/00212 |
| 2020/0210513 A1* | 7/2020 | Evans | G06F 16/986 |
| 2021/0149992 A1* | 5/2021 | Nam | G06F 40/186 |
| 2021/0203713 A1* | 7/2021 | Broddle | G06F 3/04842 |

\* cited by examiner

SYSTEM AND METHOD FOR CREATING AND RENDERING COMPLEX, HIGHLY PERFORMANT WEB INTERVIEWS USING A LOW-CODE EDITOR, SUPPORTING INTEROPERABILITY WITH EXISTING THIRD PARTY DOCUMENT ASSEMBLY SYSTEMS

This application claims the benefit of priority in U.S. Provisional Patent Appl. Ser. No. 62/959,507 filed on Jan. 10, 2020, the entire disclosure of which is incorporated herein by reference.

TECHNICAL FIELD

The present disclosure relates to methods and systems for providing an interactive interview process to acquire data for document creation, the systems and methods including dynamic templates for creation of such documents.

BACKGROUND

Businesses that offer online document creation using web forms and document assembly are faced with unique challenges. Chief among them is creating forms that are highly interactive, visual and pleasing to the end-user, while supporting data models, abstracted from the document templates, that are often archaic and almost always complex.

Further, the need for subject matters experts to have some level of control over both the interview and the documents, particularly where regular updates are required drawing on their subject matter expertise, suggests that these activities are best accomplished with a low or no code authoring environment or editor, as opposed to reliance on developers to both create and maintain the forms.

Finally, web forms that drive document assembly are often lengthy with many pages. Performance is thus critical to the success of any effort that depends on web forms to drive document assembly.

While systems and methods exist for providing highly performant web forms that support near infinite complexity, existing low or no code editors suffer from certain limitations:
a) They cannot support the level of nesting and complex data types, such as entities, that may be required to drive document assembly workflows
b) They can support highly complex data types and nesting but at a performance cost that can be significant, often measured in multiples of seconds.
c) They can support highly complex data types and nesting but only in the context of a specific document assembly suite.

The present system, and the methods described herein, overcome these limitations. Subject matter experts can create highly interactive web forms with virtually unlimited control over the data model using an easy drag-n-drop editor. A Data Engine then runs the forms with extremely low (<20 millisecond) latency. Finally, a post-processing service formats the data into any required output format to allow for interoperability with virtually any document assembly system.

Specifically, with regards to interoperability, moving highly nuanced document templates, particularly those with state specific permutations, and potential multi-party uses, into a new system can be impracticable for many businesses. The present disclosure overcomes this by allowing for near-unlimited data models and output formats and formatting. Subject matter experts working for a business are thus able to much more readily use a visual (no/low-code) editor to recreate their web forms without having to undertake the much more laborious (and almost always impracticable) step of recreating their nuanced document templates. The described systems and methods allow creating and rendering complex, highly performant web interviews by use of a low-code editor, and support interoperability with existing third-party document assembly systems.

SUMMARY

In accordance with the purposes and benefits described herein, in one aspect is provide, in a computing system environment, a method for automated document creation by a dynamic content management system, comprising by a dynamic application programming interface (API), retrieving stored existing and/or persisting user data from a server and constructing a dynamic interview form template including the retrieved data. The dynamic API pushes the dynamic template including the retrieved existing and/or persisting data to a document form engine residing on a user computing device. The document form engine constructs one or more document pages from the pushed dynamic template and retrieved existing and/or persisting user data. Each element used to construct the one or more document pages is customized to each component of the document being constructed. This may include selecting each element used to construct the one or more document pages from one or more of HyperText Markup Language (HTML), Cascading Style Sheets (CSS), and JavaScrip™.

The described methods include providing a rule engine which, on receipt of a request for document creation by the dynamic content management system, retrieves one or more templates, one or more data models, and one or more linked data models stored on a server. The retrieved one or more templates, data models, and linked data models are combined to provide the dynamic template. In an embodiment, the rule engine provides the dynamic template as a JavaScript™ Object Notation (JSON) payload for pushing to the user computing device. The rule engine may retrieve the dynamic template from a template API stored on the server and retrieves the one or more data models and one or more linked data models from a user data API stored on the same or a different server.

The dynamic content management system includes a data separation engine which fetches data from one or more of: a local data storage pool, a shared data storage pool, and a global data storage pool. The data separation engine fetches data according to the retrieved data models. In embodiments, the fetched data are saved to local storage on the user computing device. In embodiments, the retrieved one or more data models are updated according to the fetched data, and the updated data models and fetched data are stored on the server or on a different server. In embodiments, any updates to the one or more data models and fetched data are recorded as changes and saved to the user computing device document form engine.

In the following description, there are shown and described several preferred embodiments of the described methods and systems. As it should be realized, the methods and systems are capable of other, different embodiments and their several details are capable of modification in various, obvious aspects all without departing from the methods and systems as set forth and described in the following claims.

Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the described methods and systems for providing an interactive interview process to acquire data for document creation, and together with the description serves to explain certain principles thereof. In the drawing figures:

FIG. 11 illustrates an embodiment of a graphical user interface (GUI) for managing interviews on a server;

FIG. 13 illustrates an embodiment of a graphical user interface (GUI) for defining data models;

FIG. 14 illustrates an embodiment of a graphical user interface (GUI) for page level control; and FIG. 15 illustrates an embodiment of a graphical user interface (GUI) for entering information at a question level.

Reference will now be made in detail to the present preferred embodiments of the described systems and methods, examples of which are illustrated in the accompanying drawing figures.

DETAILED DESCRIPTION

Any citations or other references included or referred to in this application form a part of the disclosure and are incorporated herein in their entirety by reference. It will be appreciated that the embodiments described in this patent application are an illustration of one of the modes best suited to carry out the invention. The invention is capable of other different embodiments, and its several details are capable of modification in various, obvious aspects all without departing from the invention. Accordingly, the descriptions provided herein will be regarded as illustrative in nature and not as restrictive.

Figure 1:
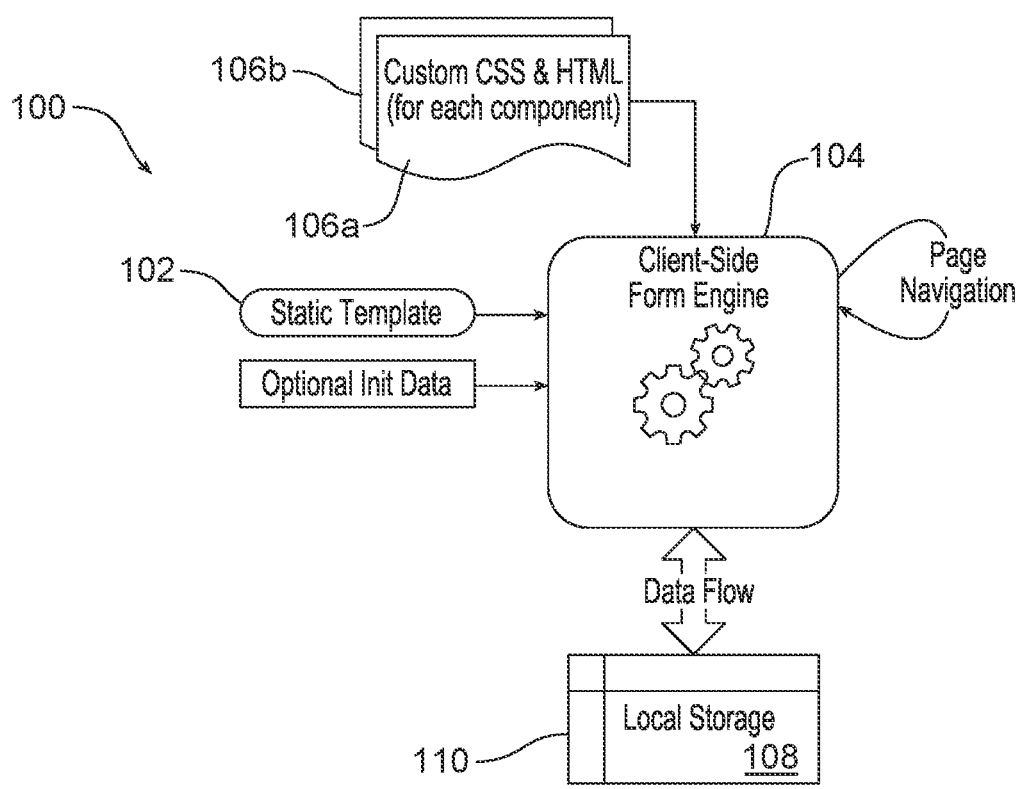
FIG. 1 illustrates an interview form engine according to the present disclosure, running in offline mode.

At a high level, the present disclosure relates to methods and content management systems for document creation, including dynamic templates for the creation. An interview form system 100 according to the present disclosure running in off-line mode is shown in FIG. 1, providing static (i.e., locally stored and not fetched from a server at time of access) templates 102 including entry means (windows, drop downs, and the like; not shown) whereby a user may input into the template 102 information needed for the document to be created. Example information can be the users name, legal name, address, birthdate, family member information, etc. This is typically done by the user responding to predetermined questions and/or checking appropriate blocks and/or selecting desired entries relating to the particular information needed/question asked. The template(s) 100 are then pushed to a client-side form engine 104. The elements $106_{a-n}$ used by the interview form engine may be selected from a number of known technologies, including without intending any limitation HyperText Markup Language (HTML), Cascading Style Sheets (CSS), JavaScript™, and others as are known in the art. The constructed documents may then be stored, such as in local storage 108 on a user computing device 110. Such static templates 102 typically provide limited flexibility. For example, conventional document systems typically only allow input of top-level variables and require redeployment of an entire application to alter the interview. On the other hand, a dynamic approach ensures that the interview is always the most recent. This can be critical in situations wherein regulatory agencies or others mandate frequent changes in document content.

To solve this problem, in an embodiment (shown representatively in FIG. 2) a dynamic content management system for document creation 200 is provided. At initiation a dynamic application programming interface (API) 202 (in one embodiment termed the SmartGuide™) is used to construct a dynamic template 204 and to retrieve existing/persisted data 206 from a server 208 (shown in greater detail in FIG. 4). The dynamic template 204 and data 206 are pushed to the client-side form engine 104. The document pages $210_{a-n}$ are then constructed, again using various technologies including without intending any limitation HyperText Markup Language (HTML), Cascading Style Sheets (CSS), JavaScript™, and others as are known in the art. Each CSS, HTML, etc. element is customized to the particular component of the document being constructed. The data are stored, for example in local storage 108 on a user computing device 110 and/or remote storage 212 (such as cloud storage) for later retrieval.

Figure 3:
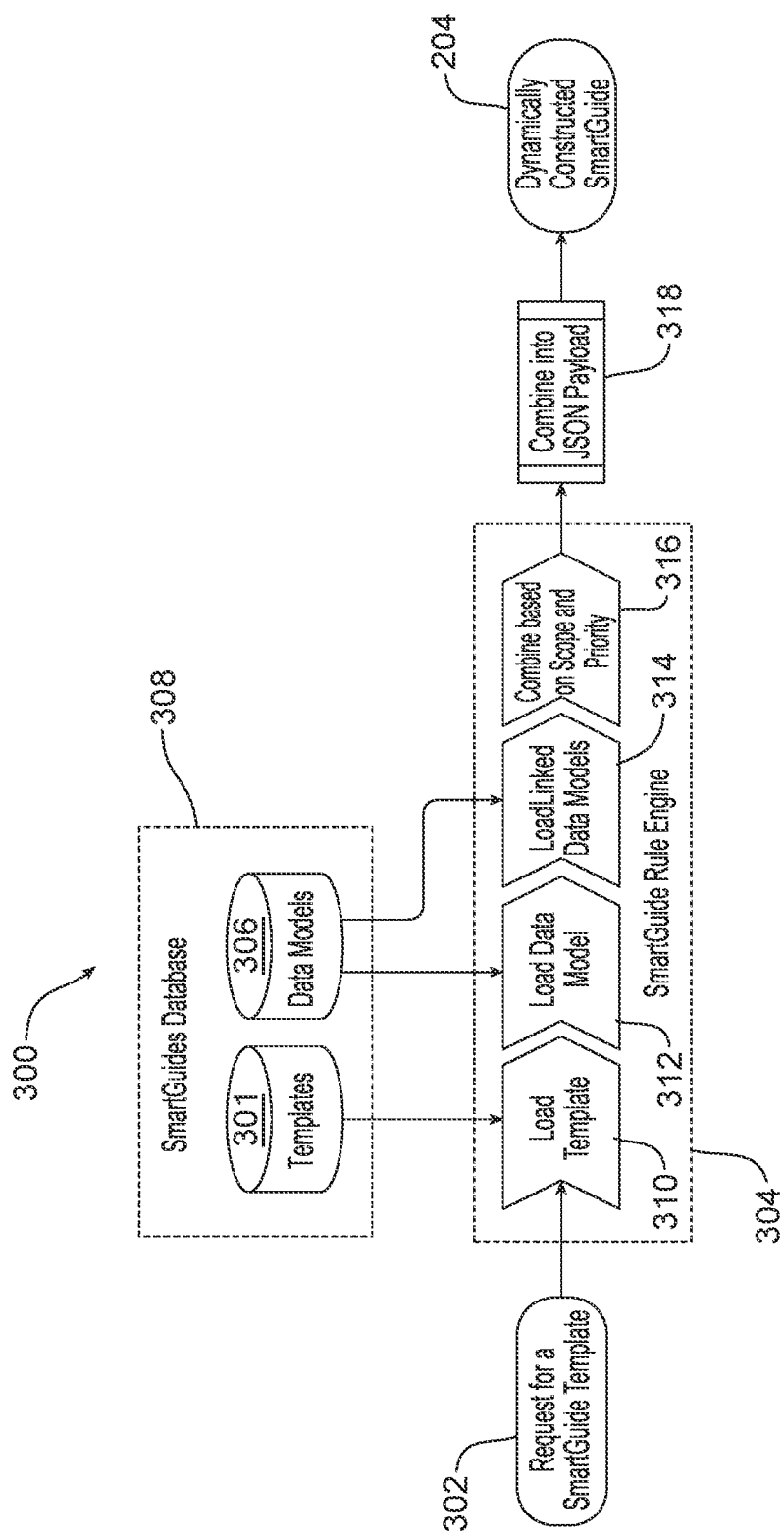
FIG. 3 illustrates in flow chart form creation of a dynamic template that is constructed for each request using stored templates and data models using the form engine of FIGS. 1 and 2.

FIG. 3 illustrates a process 300 performed by dynamic content management system for document creation 200 in more detail. At step 302 a request for a dynamic template is received. A Rule Engine 304 retrieves needed templates 301 and data models 306 from a stored database 308. The Rule Engine 304 loads the template(s) 102 (step 310), data model(s) 306 (step 312), linked data model(s) (step 314), and combines them (step 316) based on scope and priority into a JavaScript™ Object Notation (JSON) payload 318 which is provided as a dynamically constructed template 204 including data.

Figure 4:
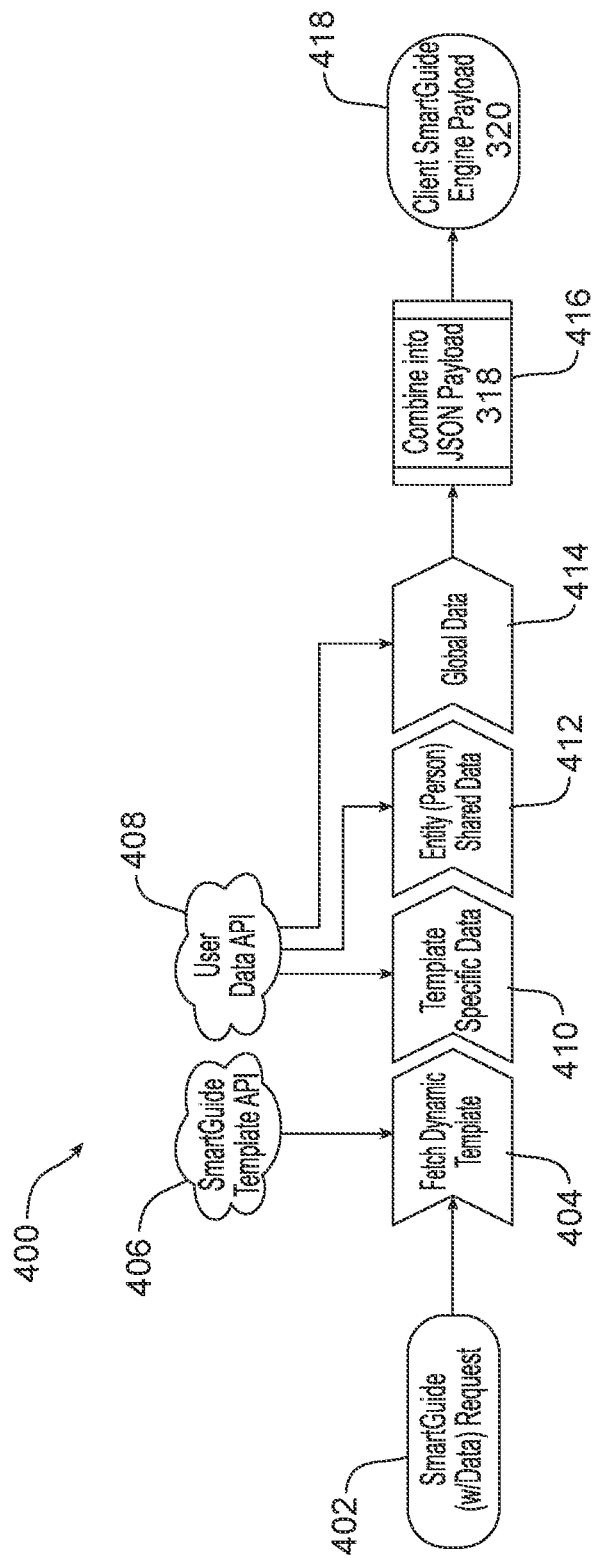
FIG. 4 illustrates a process for providing a dynamic template populated with specified data (existing client answers) to a client-side form engine.

FIG. 4 illustrates a process 400 for providing a dynamic template 204 populated with specified client data (name, address, others) to a client-side form engine 104 to allow the client-side engine to provide a desire interview form(s). On receipt of a request (step 402) for the dynamic template (with data) 204 (created by the process shown in FIG. 3), at step 404 the disclosed system 200 issue a request to a server 406 hosting a template API for the dynamic template. The system 200 retrieves from a User Data API 408: template-specific data (step 410), entity (person) shared data (step 412), and global data (step 414), all relating to a particular document(s) to be constructed. These are combined into the JSON payload 318 (step 416) and provided to the client-side form engine 104 as a client engine payload 320 (step 418), to provide the desired document(s).

Figure 5:
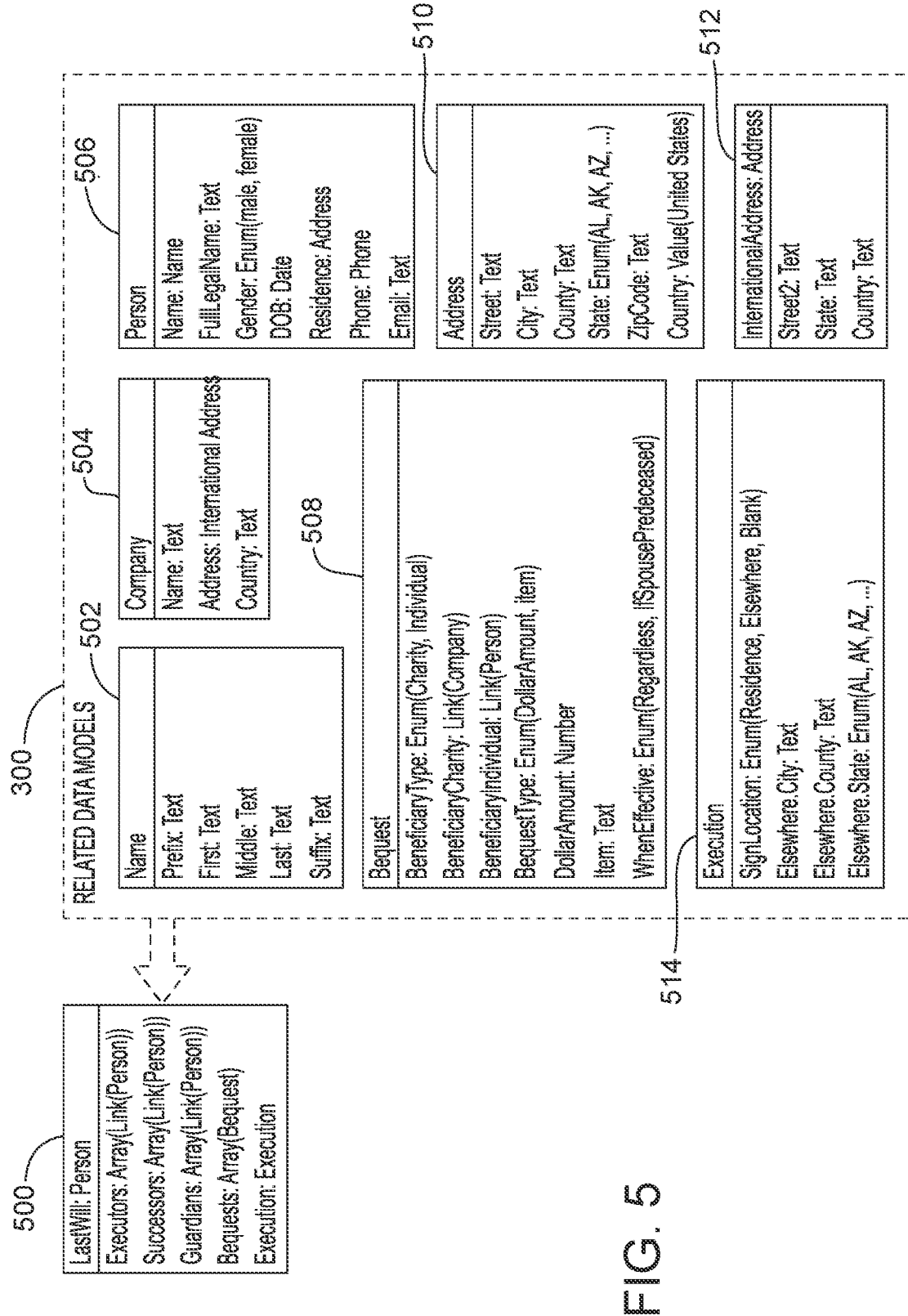
FIG. 5 illustrates potential related data models used in constructing a particular document type (last will and testament)

A variety of possible document types and related data models 306 for providing the documents are contemplated. One possible embodiment of a top level data model 500 is shown in FIG. 5, being a data model for a last will and testament. As is known, a will 500 may include a variety of required and optional information, such as an executor, identification of successors, identification of guardians, identification of bequests, and execution by the individual preparing the will 500. In such a situation, useful and/or necessary data models providing information for populating the document 500 may include information regarding individuals associated with the document (model 502), information regarding companies (model 504), personal information such as name, gender, date of birth, and others (model 506), information regarding the bequest(s) such as beneficiary type (individual, charity, others), type of bequest, amount of bequest, and others (model 508), domestic address information for individuals or companies (model 510), international address information for individuals or companies (model 512), and information regarding the location of execution of the document 500 such as residence information, state, county, country, and others (model 514). Regarding the international address information (model 512), the inheritance presented as InternationalAddress: Address (IntAdd) contains all fields of Address plus additional street line and two redefinitions as value of a country that is no longer fixed to "Value(United States)."

Of course, the listing of information to be entered into the data models 306 is representative only and is not intended to be limiting. Equally, the skilled artisan will appreciate that the information may be entered by any number of known methods, such as selecting from predetermined choices via drop-downs or buttons, free text entry, and others.

Figure 6:
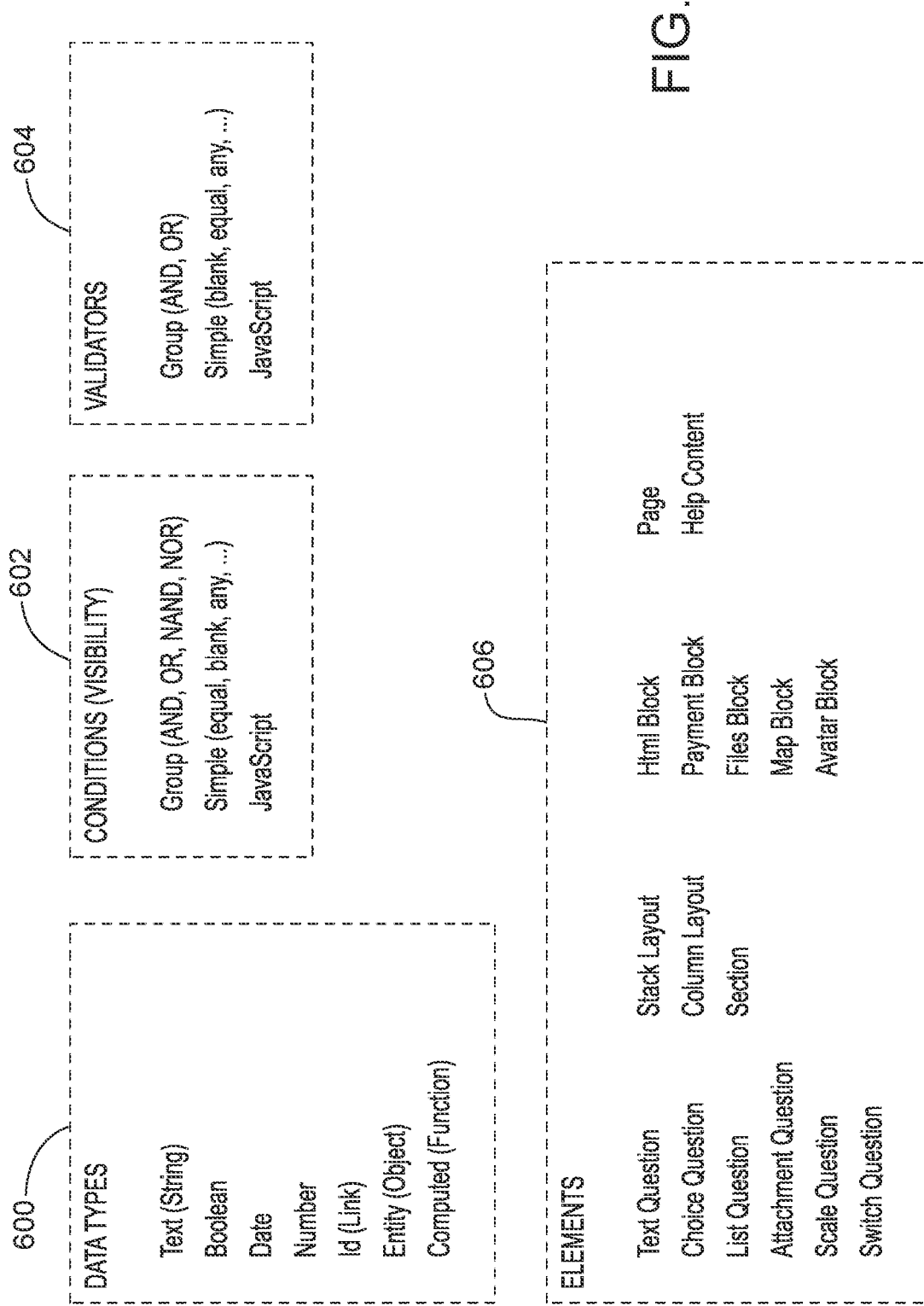
FIG. 6 illustrates exemplary data types, visibility conditions, validators, and elements contemplated for inclusion in the data models.

As shown in FIG. 6, a variety of data types 600, visibility conditions 602 (i.e., shown or hidden based on predetermined criteria), validators 604 (i.e., can answers be propagated and put in data storage), and elements 606 are contemplated for inclusion in the data models 306. For example, data types 600 may include text (string), Boolean, dates, numbers, identifiers (link), entity (object), or computed (i.e. function).

Figure 7:
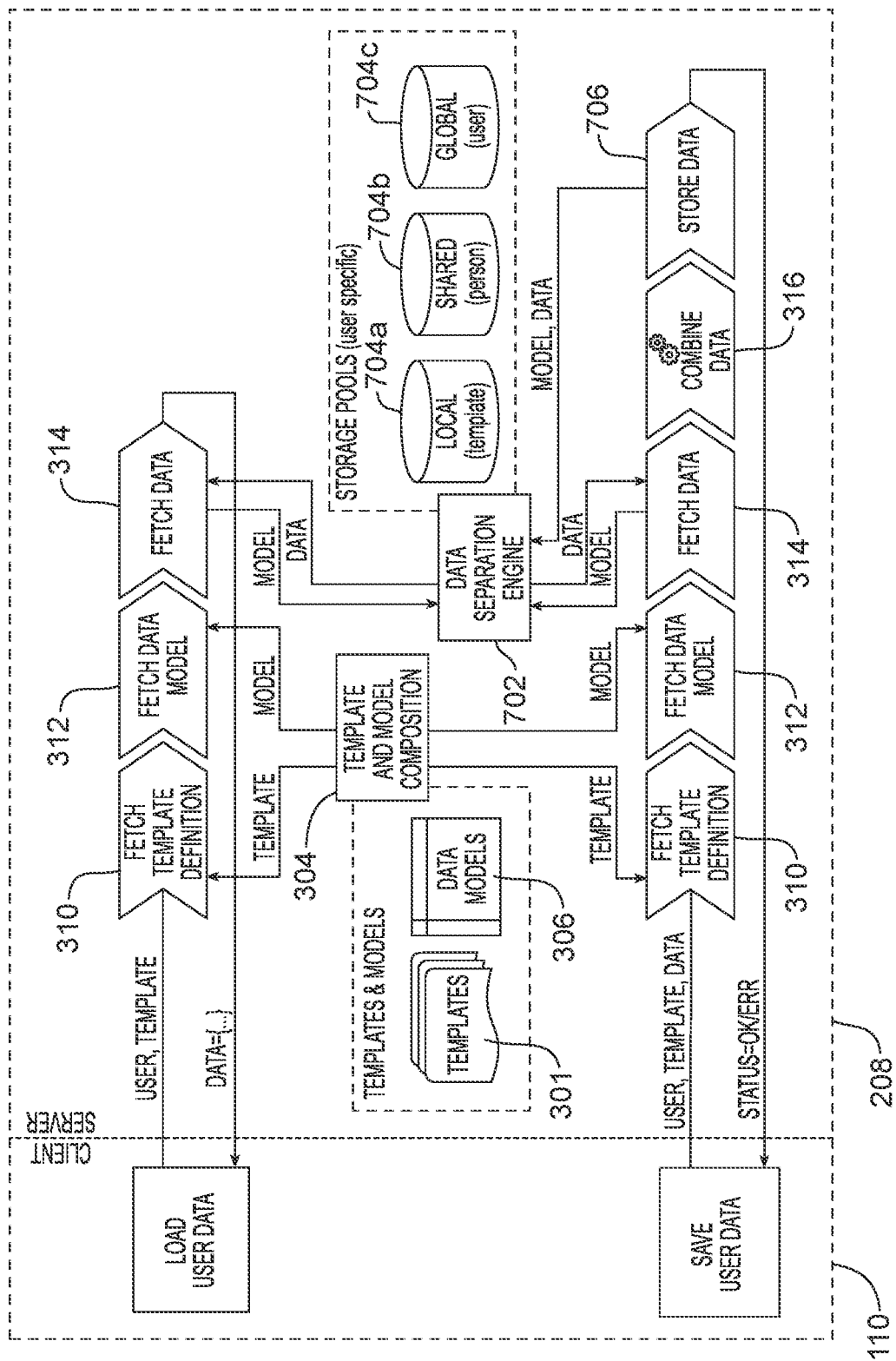
FIG. 7 illustrates a process of retrieving user data from a server by a user computing device and/or for saving user data from the user computing device to the server, performed by the system of FIG. 2.

FIG. 7 illustrates in detail a process 700A of retrieving user data from a server 208 by a user computing device 110, or a process for saving user data from the user computing device 110 to the server 208, performed by system 200. In the process for retrieving user data 206 from a server 208 by a user computing device 110, as described above in the discussion of FIG. 3 user information and a user template are retrieved by the server 208, and template definition(s) 310 and data model(s) 312 are fetched. The data model(s) are specified in the template definition(s). At step 314 a data separation engine 702 fetches data according to a selected data model(s) 312 by pulling from three data storage pools 704a, 704b, and 704c (see also FIG. 4, ref. num. 410, 412, 414), with storage pool 704a being a local (template) data storage pool, storage pool 704b being a shared (person) data storage pool, and storage pool 704c being a global (user) data storage pool. The data retrieved from these data storage pools 704 are according to the selected data model(s) 312. The fetched data are then saved back to the user computing device 110.

In the process for saving user data from user computing device 110 to server 208, user information, a user template, and stored user data are retrieved by the server 208, and template definition(s) 310 and data model(s) 312 are fetched. The data model(s) are specified in the template definition(s). As before, at step 314 a data separation engine 702 fetches data by pulling from three data storage pools 704a, 704b, and 704c, with storage pool 704a being a local (template) data storage pool, storage pool 704b being a shared (person) data storage pool, and storage pool 704c being a global (user) data storage pool. The data retrieved from these data storage pools 704 are according to the selected data model(s) 312. As before (see FIG. 3), the data and models are combined according to scope and priority at step 316. The existing user data from the storage pools is combined with the new data sent by the user's computing device, and the results are provided as updated values which are persisted on the server 208. At step 706 the updated model and data are returned to the data separation engine 702, and also stored on server 208. A status (OK, ERR) is returned to the user computing device 110.

Figure 2:
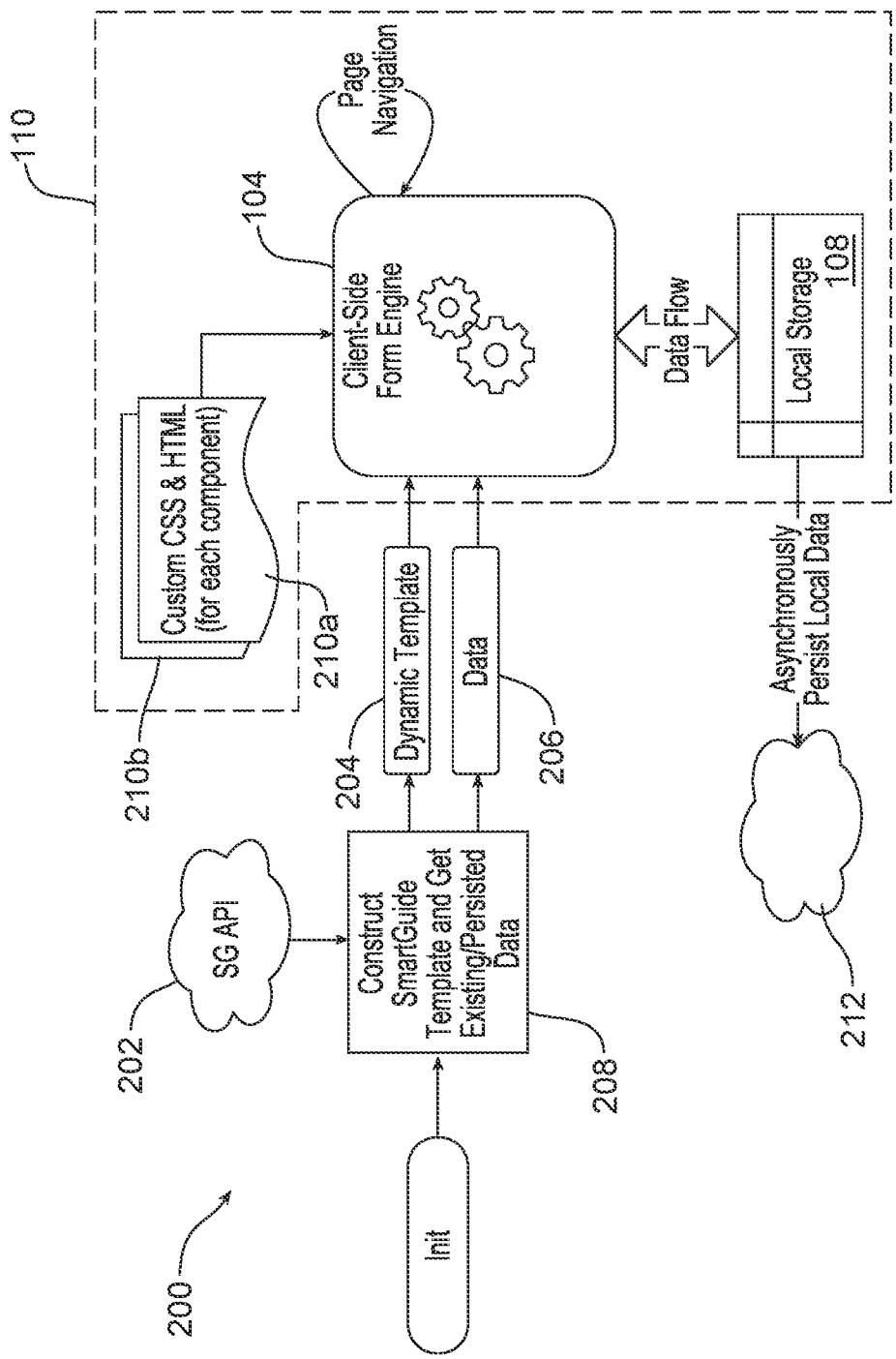
FIG. 2 illustrates the interview form engine of FIG. 1, running in online mode.
Figure 8:
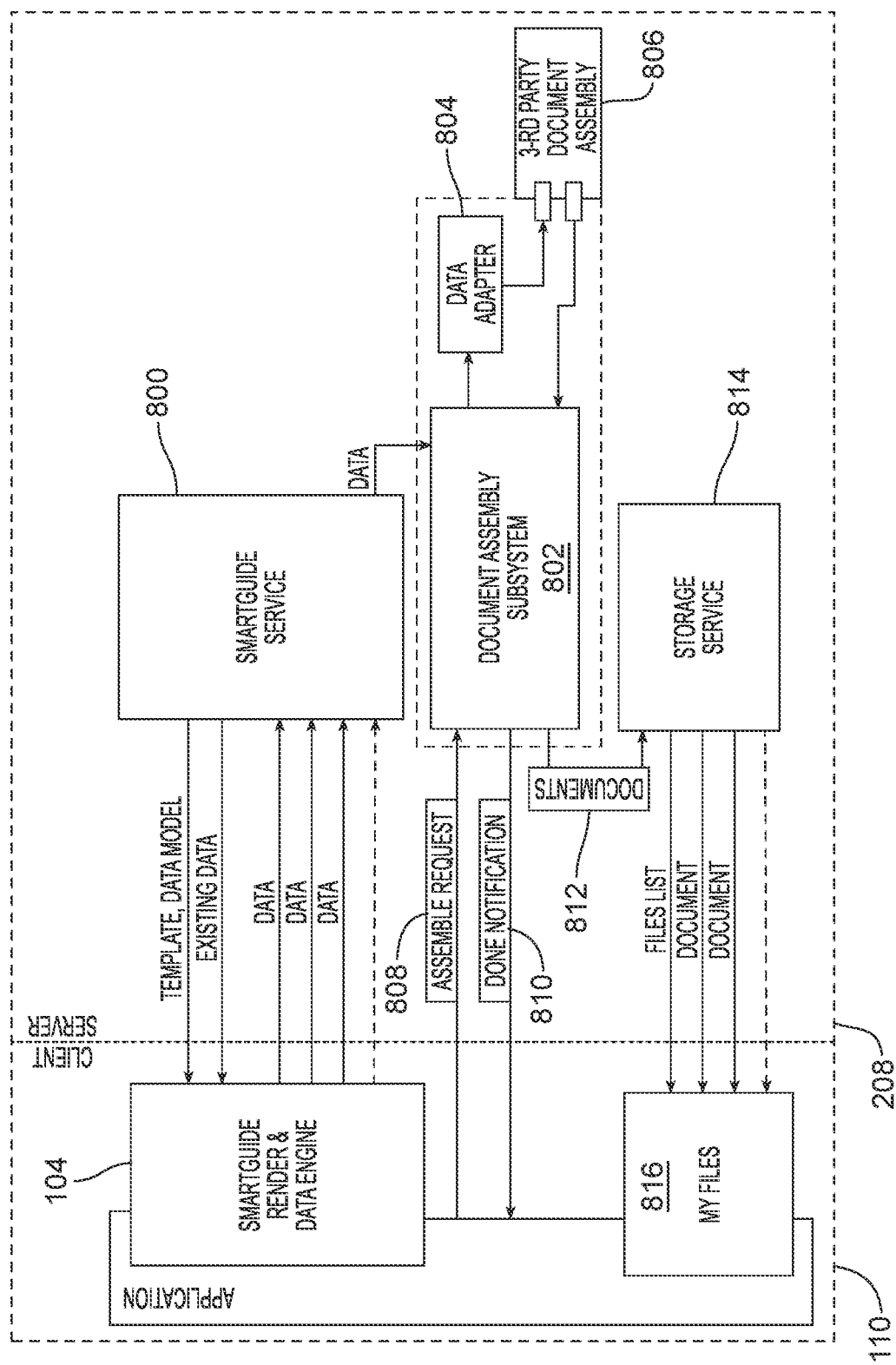
FIG. 8 illustrates a process of document assembly by the system of FIG. 2, including beginning a document interview, entering data, persisting data, creating a document from the interview and data, and downloading the document.

FIG. 8 shows a process of document assembly by the system of FIG. 2. As described above, a dynamic template (including data and data models) are pushed from server 208 to a client-side form engine 104. The completed data are pushed back to a data service 800 on server 208 and from there to a document assembly subsystem 802. If needed, a data adapter 804 is provided which is configured to adapt to any third party document assembly subsystem 806, which then returns the completed document to the document assembly subsystem 802. On receipt of a document assembly request 808 from form engine 104, the desired documents are assembled. A "document done" notification 810 may be pushed to the user computing device 110. Completed document(s) 812 are stored in storage service 814 and pushed to local storage 816 (which is a file browsing module where a file list is presented and documents are downloaded on request) on user computing device 110. The file list/documents can optionally be cached for offline use in local storage (not shown).

Figure 9:
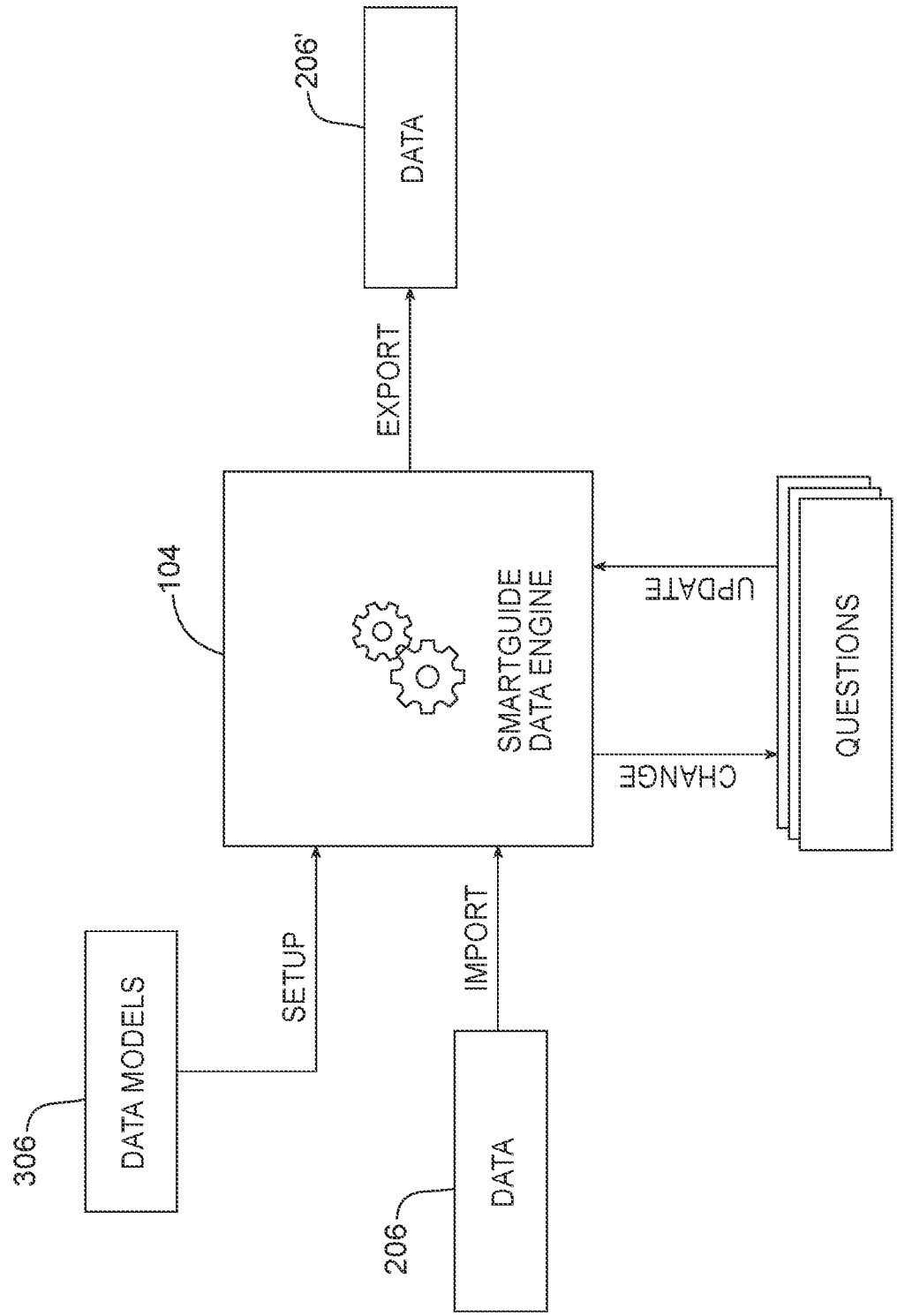
FIG. 9 illustrates a data engine subpart of the form engine of FIGS. 1 and 2, constructed from a template data model.

FIG. 9 illustrates at a high level data processing/manipulation of the described form engine 104 in updating data. As described above, dynamic templates including data models 306 and data 206 are imported by client-side form engine 104. Any determined changes in the data models 306 and/or data 206, i.e. to the responses to questions, are recorded as changes and updated to the form engine 104. Any such changes are exported as updated data 206' and stored.

Figure 10:
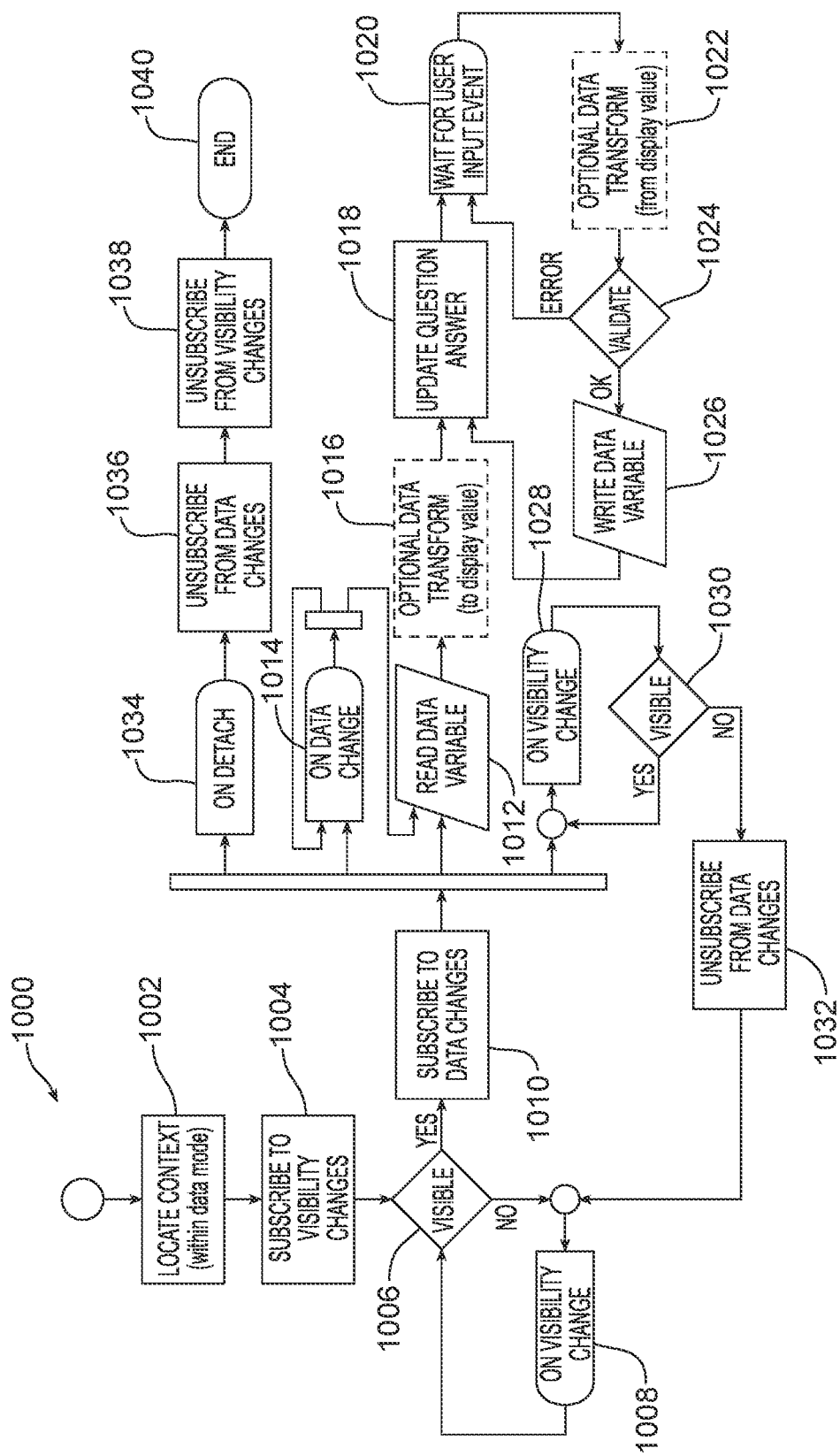
FIG. 10 illustrates the flow of a single question construction with in an interview form according to the present disclosure, and attendant behavior on user and system interactions and disposal.

FIG. 10 illustrates in greater detail the processes described in FIG. 9, for example a process 1000 associated with a particular question interview form FirstName. At step 1002 the context of the question asked (FirstName) is established (if it is inside of some other question/element of the interview form or at the top level). At step 1004 a user must check the question's visibility condition (i.e. make it "visible" per step 1006) to proceed before it can subscribe to data change updates. If the question's visibility condition is "no," the user must change (step 1008) that to proceed. If the question's visibility condition is "yes," the user can proceed to subscribe to data changes (step 1010).

Next begins a parallel process. The system reads a data variable (step 1012 after subscribing to data changes at step 1010) and determines at step 1014 whether there has actually been a data change to the question. Optionally, at step 1016 the data is transformed to display value. At step 1018 the question answer is updated and the system waits for user input (step 1020). On receipt of user input (optionally transformed from display value at step 1022), at step 1024 the input is validated. At step 1026 the input data variable is written according to the input change and the interview form question answer is updated (step 1018) to the data engine.

Other processes handle in parallel visibility changes, data change by other answers or computations and destruction of the element due to for example a page change. On notation of a visibility change (step 1028), the system determines if the visibility has been changed to "yes" or "no" (step 1030). If a visibility condition is determined as "no" at step 1032 the system unsubscribes the question from data changes.

In the event of a page change or other event resulting in destruction of the element (step 1034), the question is unsubscribed from data changes (step 1036), unsubscribed from visibility changes (step 1038), and the process ends (step 1040).

It will be appreciated that a user by the described methods and systems can create highly interactive web forms with virtually unlimited control over the data models by use of a simple drag-and-drop editor/graphical user interface (GUI). In one possible embodiment, a system for creating a JSON payload 318 as described above is contemplated, comprising a rules editor for defining page and question level business logic. A drag-and-drop GUI may be used for creating, defining, and arranging variables on pages as well as for creating, defining, and arranging containing variables and business logic within a particular interview form. A validation editor may be used for defining rules to determine if values entered by a user into a particular interview form confirm to a scheme created by the interview form designer and for providing appropriate feedback in the event non-conforming values are provided. A data model editor may be provided for setting variable names, types and definitions (if applicable). The created JSON payloads 318 may be managed, assigned to desired portals, and given visibility rules. In turn, optionally the JSON payloads 318 may be designated as "draft" and hidden from user view while undergoing testing by the interview form designer.

Figure 11:
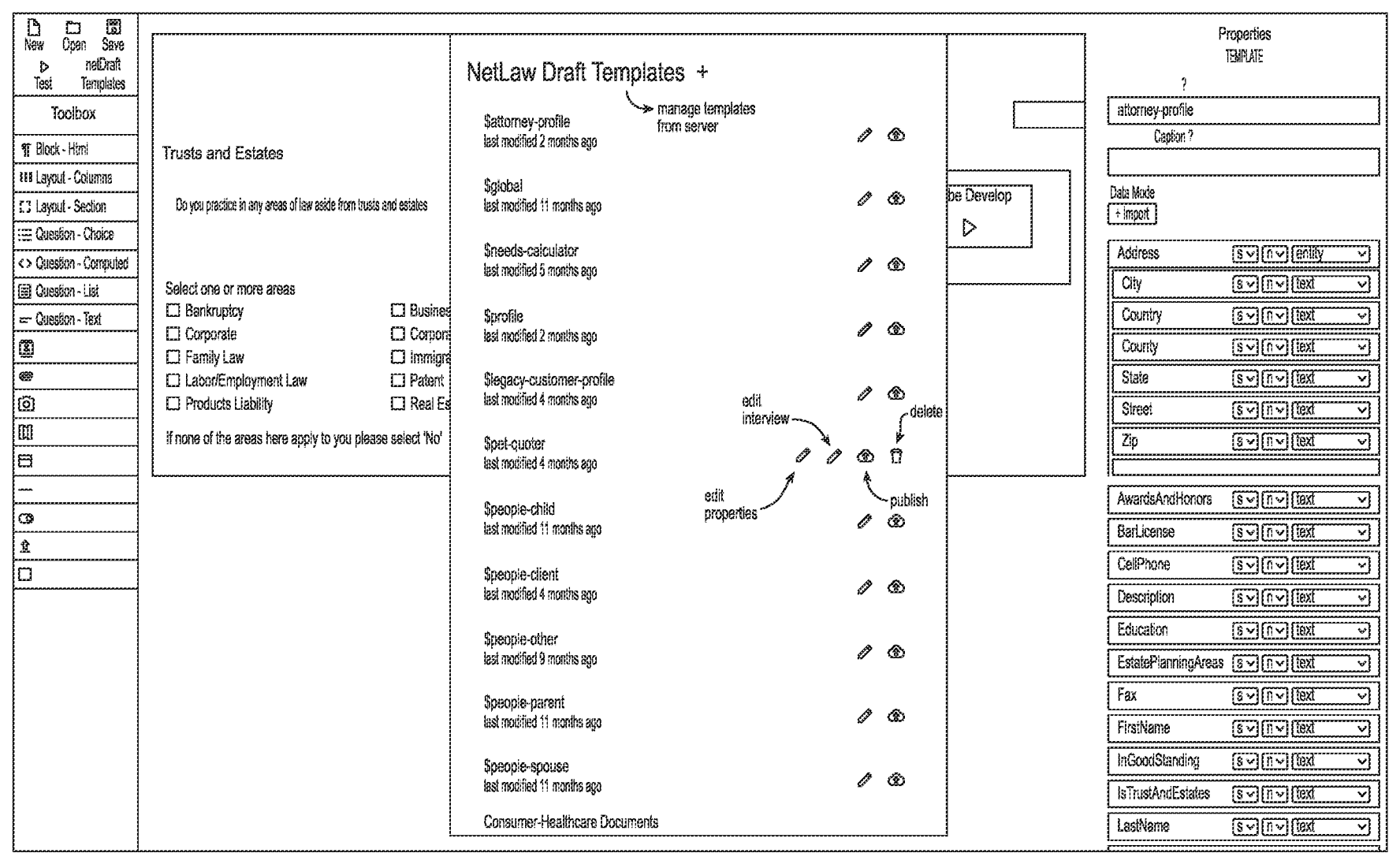
Figure 12:
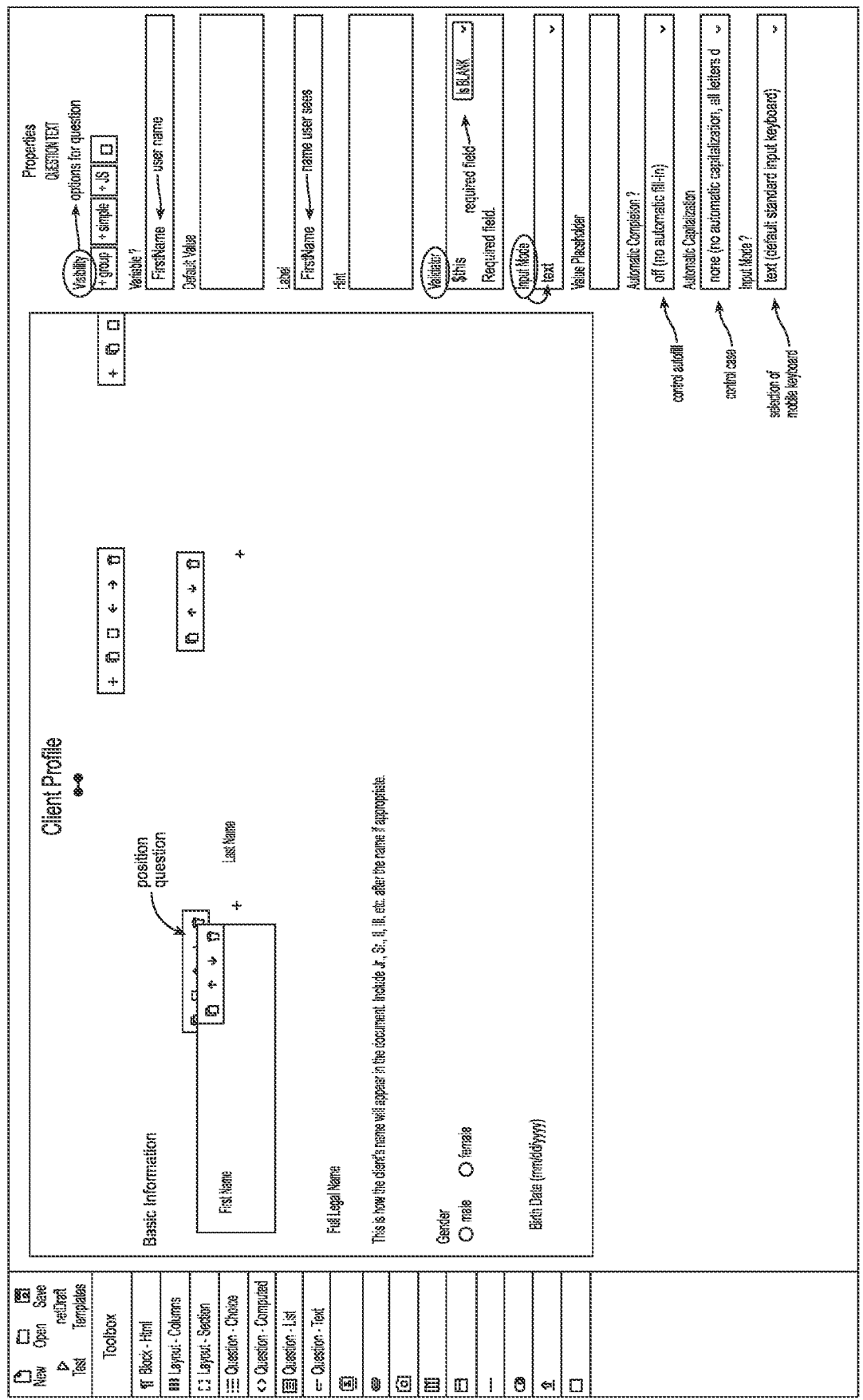
FIG. 12 illustrates an embodiment of a graphical user interface (GUI) for answering interview form questions by text entry.
Figure 13:
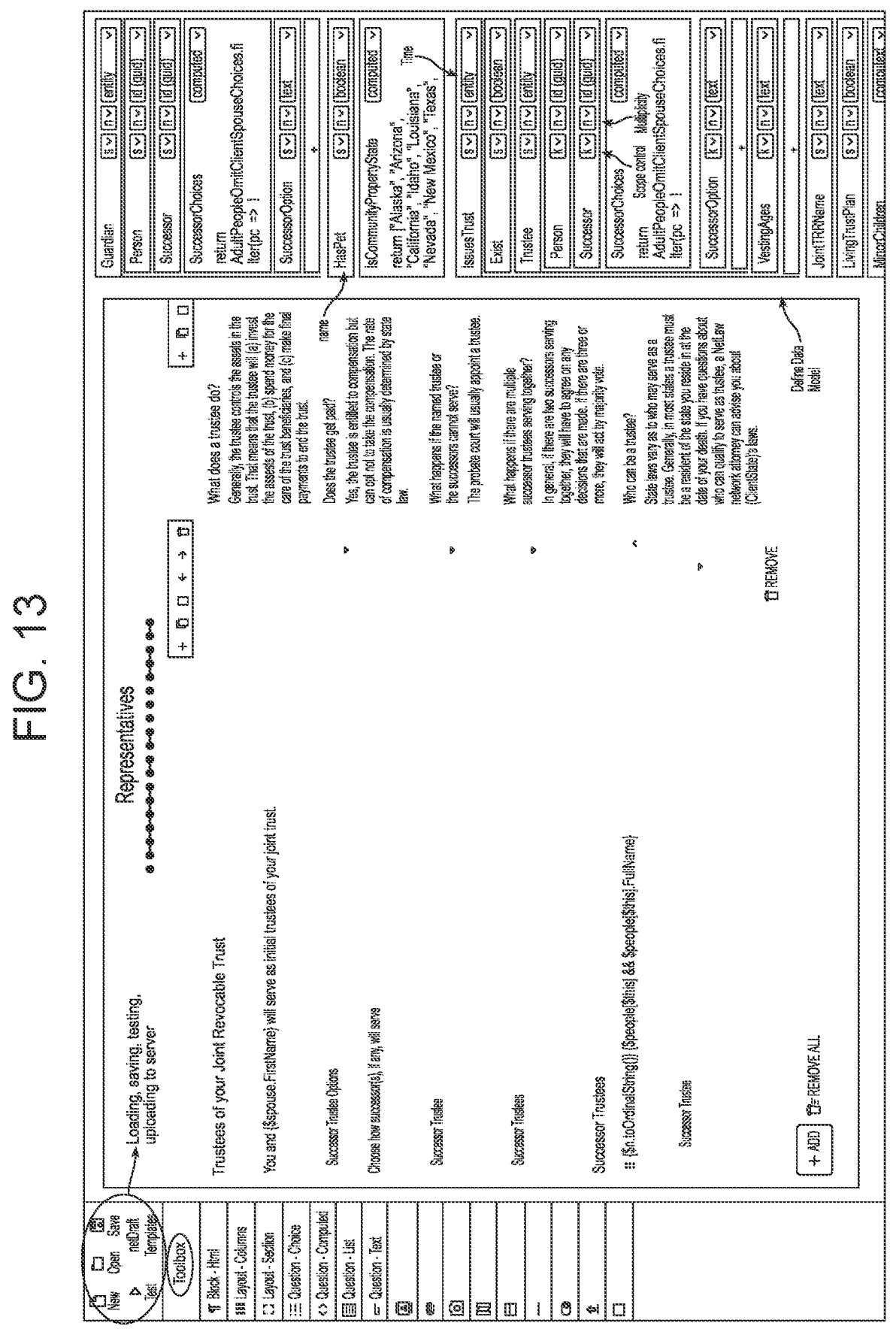
Figure 14:
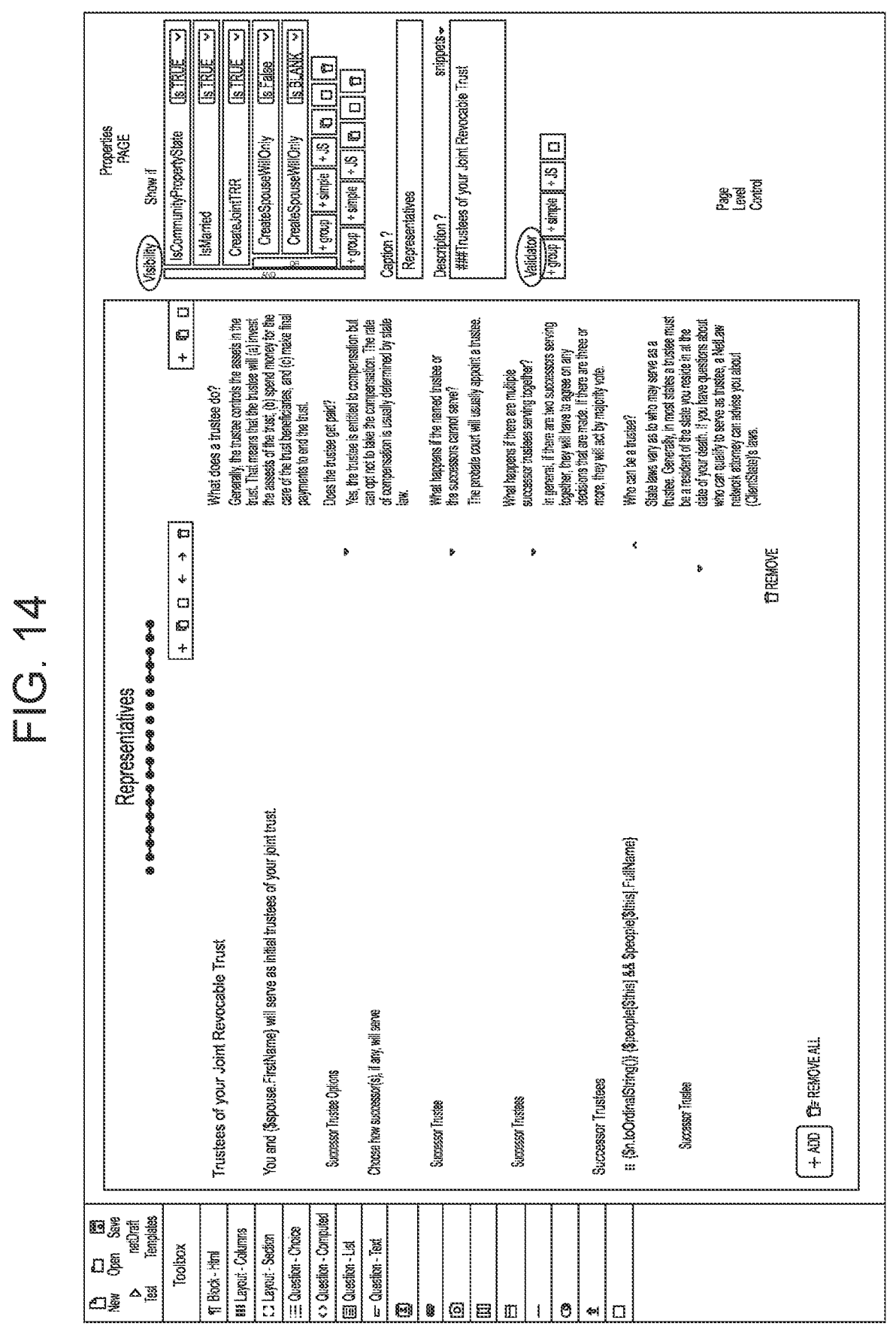
Figure 15:
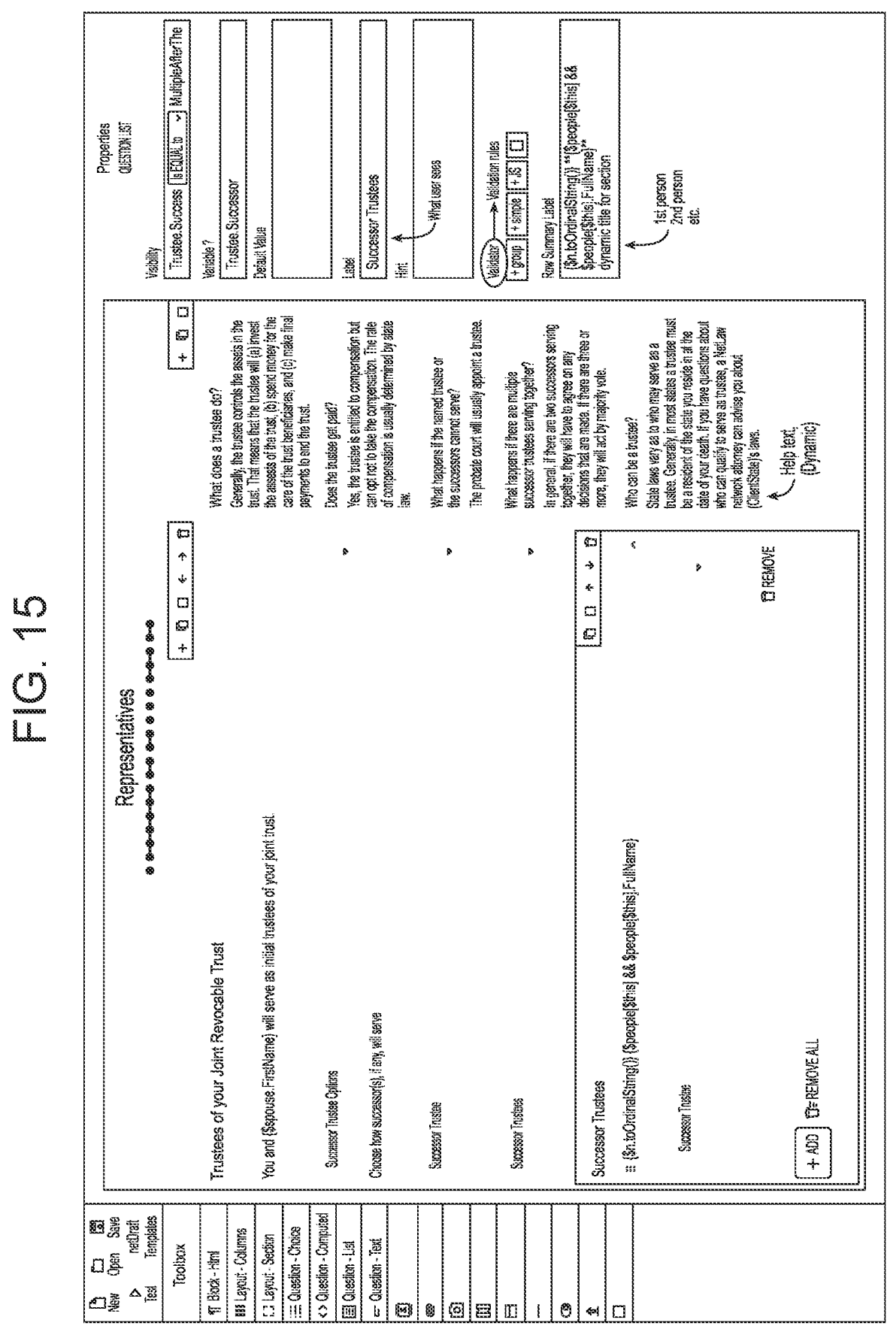

Exemplary editors/GUIs are shown for managing interviews on a server (FIG. 11), for answering interview form questions by text entry (FIG. 12), for defining data models (FIG. 13), for page level control (FIG. 14), and for entering information at a question level (FIG. 15).

By the described methods/content management systems, rather than only admitting of entry of top-level variables each variable may be nested and made a complex object allowing greater flexibility in the level of data input. Further, the use of a dynamic template and other elements described above allow a dynamic computation of each variable of the document(s) created for visibility and validation. Moreover, content management and control over content by the user is enhanced. The described content management system/method provides a performance hybrid wherein the document creation requires no server interaction. Instead, the payload(s) from the described content management system are delivered from/run on the client/user computing system. Indeed, there is no reference back to a server other than for purposes of saving/storing data. The described content management system is therefore much faster than conventional server-based systems.

The described embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. In a computing system environment, a method for automated interactive web form creation by a dynamic content management system, comprising:
   by a dynamic application programming interface (API), retrieving one or both of stored existing and persisting user data from a server and constructing a dynamic template;
   by the dynamic API, pushing the dynamic template including the retrieved one or both of existing and persisting user data to a document form engine residing on a user computing device; and
   by the document form engine residing on the user computing device, constructing one or more interactive web form pages from the pushed dynamic template.

2. The method of claim 1, including customizing each element used to construct the one or more interactive web form pages to each component of the interactive web form being constructed.

3. The method of claim 2, including selecting each element used to construct the one or more interactive web form pages from one or more of HyperText Markup Language (HTML), Cascading Style Sheets (CSS), and JavaScript™.

4. The method of claim 1, including providing a rule engine which, on receipt of a request for interactive web form creation by the dynamic content management system:
   retrieves one or more templates, one or more data models, and one or more linked data models stored on a server; and
   combines the retrieved one or more templates, data models, and linked data models to provide the dynamic template.

5. The method of claim 4, wherein the rule engine provides the dynamic template as a JavaScript™ Object Notation (JSON) payload for pushing to the user computing device.

6. The method of claim 4, wherein the rule engine retrieves the dynamic template from a template API stored on the server and retrieves the one or more data models and one or more linked data models from a user data API stored on the same or a different server.

7. The method of claim 1, further including providing in the dynamic content management system a data separation engine which fetches data from one or more of: a local data storage pool, a shared data storage pool, and a global data storage pool.

8. The method of claim 7, wherein the data separation engine fetches data according to the retrieved data models.

9. The method of claim 8, wherein the fetched data are saved to the user computing device.

10. The method of claim 8, wherein the retrieved one or more data models are updated according to the fetched data and the updated data models and fetched data are stored on the server.

11. The method of claim 10, wherein any updates to the one or more data models and fetched data are recorded as changes and saved to the user computing device document form engine.

12. In a computing system environment, a method for automated interactive web form creation by a dynamic content management system, comprising:
provinding a dynamic application programming interface (API) comprising a rule engine which, on receipt of a request for interactive web form creation by the dynamic content management system:
retrieves one or more templates, one or both of stored existing and persisting user data, one or more data models, and one or more linked data models stored on a server; and
combines the retrieved one or more templates, one or both of stored existing and persisting user data, one or more data models, and one or more linked data models to provide a dynamic template formatted as a JavaScript™ Object Notation (JSON) payload;
by the dynamic API, pushing the JSON payload to a document form engine residing on a user computing device; and
by the document form engine residing on the user computing device, constructing one or more interactive web form pages from the pushed dynamic template.

13. The method of claim 12, including customizing each element used to construct the one or more interactive web form pages to each component of the interactive web form being constructed.

14. The method of claim 13, including selecting each element used to construct the one or more interactive web form pages from one or more of HyperText Markup Language (HTML), Cascading Style Sheets (CSS), and JavaScript™.

15. The method of claim 12, wherein the rule engine retrieves the dynamic template from a template API stored on the server and retrieves the one or more data models and one or more linked data models from a user data API stored on the same or a different server.

16. The method of claim 12, further including providing in the dynamic content management system a data separation engine which fetches data from one or more of: a local data storage pool, a shared data storage pool, and a global data storage pool.

17. The method of claim 16, wherein the data separation engine fetches data according to the retrieved data models.

18. The method of claim 17, wherein the fetched data are saved to the user computing device.

19. The method of claim 17, wherein the retrieved one or more data models are updated according to the fetched data and the updated data models and fetched data are stored on the server.

20. The method of claim 19, wherein any updates to the one or more data models and fetched data are recorded as changes and saved to the user computing device document form engine.

* * * * *